United States Patent
Kruger (10) Patent No.: US 6,860,804 B2
(45) Date of Patent: Mar. 1, 2005

(54) LAYING-DOWN SYSTEM AND VISION-BASED AUTOMATIC PRIMAL CUTTING SYSTEM IN CONNECTION THEREWITH

(75) Inventor: Peter Kruger, Esbjerg (DK)

(73) Assignee: KJ Maskinfabriken A/S, Hjerting (DK)

( * ) Notice: Subject to any disclaimer, the term of this patent is extended or adjusted under 35 U.S.C. 154(b) by 0 days.

(21) Appl. No.: 10/426,021

(22) Filed: Apr. 30, 2003

(65) Prior Publication Data

US 2004/0029514 A1 Feb. 12, 2004

Related U.S. Application Data (63) Continuation-in-part of application No. 10/069,500, filed as application No. PCT/DK00/00475 on Aug. 28, 2000, now Pat. No. 6,692,345.

(30) Foreign Application Priority Data

Aug. 27, 1999 (DK) .......................................... 1999 01199

(51) Int. Cl.⁷ .............................................. A22C 18/00
(52) U.S. Cl. ...................................................... 452/157
(58) Field of Search ................................ 452/157, 177, 452/183, 180, 134

(56) References Cited

U.S. PATENT DOCUMENTS 3,982,299 A  *  9/1976  Kompan ..................... 452/157
4,189,806 A  *  2/1980  Van Heyningen ........... 452/134
4,979,269 A  * 12/1990  Norrie ........................ 452/134
6,692,345 B1 *  2/2004  Kruger ....................... 452/177

FOREIGN PATENT DOCUMENTS

| DE | 41 09 345 A1 | 9/1991 |
| DE | 41 31 556 A1 | 4/1992 |
| DK | 161656 B | 8/1991 |
| DK | 167462 B2 | 11/1999 |
| EP | 0 594 528 A2 | 4/1994 |

* cited by examiner

Primary Examiner—Thomas Price
(74) Attorney, Agent, or Firm—Nixon Peabody LLP; David S. Safran (57) ABSTRACT

In the primal cutting-up of half carcasses of animals (12), vision systems are known whereby the determination of one or more fix points on the carcasses takes place, and where on the basis of the position of these points a visualization of the ideal cut line is effected. But the primal cutting-up of carcasses (12) has hitherto been carried out with manually-operated saws on the basis of operator evaluation. However, the use of manually-operated saws involves the possibility of deviations in relation to the ideal cut line, and the manual work is very monotonous and fatiguing for the operators. There is thus disclosed a system as well as a laying-down module (2) and a vision-based system for automatic primal cutting-up of half carcasses, comprising a laying-down module with a laying-down conveyor (18), and a laying-down and angle-positioning module (6) with sideways displaceable conveyors for positioning of a relevant carcass (12) for sawing-up in a subsequent saw module (8), and a method for the execution of automatic primal cutting-up of meat items, namely half carcasses of animals.

9 Claims, 10 Drawing Sheets

LAYING-DOWN SYSTEM AND VISION-BASED AUTOMATIC PRIMAL CUTTING SYSTEM IN CONNECTION THEREWITH

This application is a continuation in part of Ser. No. 10/069,500 filed on Jul. 8, 2002, now U.S. Pat. No. 6,692,345.

BACKGROUND OF THE INVENTION

1. Field of the Invention

The present invention concerns a laying-down system for building together with plant for the primal cutting-up of meat items, namely half carcasses of pigs. The invention also concerns a fully-automatic system for the primal cutting-up of meat items, namely half carcasses of pigs, and comprising a laying-down module, a vision-based detection system for the determination of relevant fix points on meat items, a calculation unit with interface for the controlling of a positioning module and a sawing module. Moreover, the invention concerns a method based on a vision system for primal cutting-up of meat items.

The dividing-up of half pig carcasses is traditionally carried out by an operator placed at a conveyor belt on which the carcasses pass, in that he manually corrects (pulls/pushes) the half carcass in position for a saw (circular knife) which is disposed above the conveyor belt. With this method, use is made of an operator and a saw for each cut which is made in the half carcasses.

The way in which the correction of the half carcasses is typically carried out is that a line laser marker mounted on the individual saws irradiates the conveyor band immediately in front of the saw in an imaginary line through the blade of the saw, and the operator uses this laser beam in moving the half carcass manually so that this is sawn through in the desired place.

The above-mentioned method has several disadvantages. In the first place, the operator's work is monotonous and physically demanding, and operators who carry out this work are worn-out by the work after a relatively short period. Secondly, the positioning of the cut is based on the subjective judgment of the individual operator, so that the accuracy can fall with changing operators, inattention on the part of the operator, or if he has difficulty in maintaining the necessary concentration over longer periods of time. Thirdly, the definition of the correct knife positioning can change during the course of the production, which necessiates verbal communication of the changed requirements out to a number of operators, which involves possibilities of error.

2. Description of Related Art

Efforts have been made to automate the above-mentioned method, for example in DK B 161 656 there is disclosed a semi-automatic plant of the kind whereby an operator moves a position-provider coupled to a laser beam to the positions on the half carcass where he judges that the cuts shall be placed. When the laser beam irradiates the place of the cut, the operator activates an operating element, whereby the position of the position-provider is read into a control system. The positions of the cutting places are used to position the half carcasses and the subsequent saws, so that the different cuts are effected in accordance with the judgment of the operator. The publication also discloses a method for arranging the individual half carcasses so that their lengthways axes are positioned at right-angles to the feeding direction. With the said system, it is thus possible for human errors of judgment to be made in connection with the positioning which determines the cuts which are to be carried out in the half carcasses.

In DK T3 0 594 528, a system is disclosed by which, with the help of mechanical measuring of the half carcasses, it can carry out a tri-partition of these (ham and fore-end cuts). The arranging of the half carcasses to the correct angle takes place in connection with the measuring of fix points in the pig carcass, in that this is drawn over the surface of the conveyor by means of the mechanical measuring means.

The above-mentioned methods are based either on manual or mechanical localization of the fix points which form the starting point for the cutting-up positions.

DK B1 167 462 discloses a vision system for the determination of said fix points on the half of an animal carcass, said vision system being coupled to a computer for the implementation of picture analysis which, after the determination of the position of fix points in a manner which is not specified, is said to send control signals to mechanisms which are not further described, and which on the basis of the positioning of the fix points carry out the arranging of the carcass and of the system's tools for the cutting-up of said carcass.

However, several different patents and patent applications are to be found which deal with actual vision analyses of meat products, partly with the view of classifying meat products, e.g. for determining the market value, and partly to be able to determine the position of certain structures. Among these there are two German publications, DE C2 41 31 556 and DE A1 41 09 345, to which reference is made when, in connection with the present invention application, vision analysis/determination of fix points on half carcasses is discussed. The precondition for the present invention is thus that the position of the fix points on half carcasses, which are used as starting point for the determination of the individual cuts, takes place by means of said vision system. The vision system comprises a video camera which takes a picture of the half carcass while this passes under the camera on a conveyor. The camera is coupled to a computer, which with specially-developed software recognizes the contours and inner structure of the half carcass, such as e.g. vertebrae in the spine and the pubis. Hereafter, with great accuracy the computer calculates the positions of the individual fix points in relation to a given zero line. By means of the computer together with suitable interface and actuators, the positioning of the fix points in relation to the zero line can subsequently be used for effecting mutual positioning of the half carcasses/saws with starting point in a beforehand desired positioning of the cuts in relation to said positioning of said fix points. The positioning can take place either by effecting a displacement of the saws (saw blades) in the lateral direction, still with the blades arranged parallel with the transport direction, and/or by using conveyor plant which can be displaced in the transverse direction by means of actuators.

The above-mentioned method and system is particularly suitable for use when an ordinary "industrial cut" is to be made (double cut where the fore-end and hams are separated from the central piece) at right-angles to the lengthways direction of the carcass, where the half carcasses are transported with the lengthways direction arranged at right-angles to the direction of transport, and where the parting cuts are placed in relation to the positions of the fix points by positioning of the half carcasses on sideways-displaceable conveyors, and positioning of the saws in the sideways direction.

If only a ham cut is to be carried out, which is sometimes known as a "Belgian cut", also in the following, it will not be possible to use the above-mentioned method for automatic parting of the carcass, in that a Belgian cut is effected as an inclined cut in relation to the lengthways direction of the carcass, though still in relation to the positioning of the relevant fix point on the half carcass. When carrying out the parting with this type of cut, it has thus hitherto been necessary to effect the cutting manually with manually-operated saws with laser marking of the positioning of the cut, in that the cut which is carried out here shall extend at an angle in relation to the direction of transport. Neither is the above-mentioned method particularly suitable when it is preferred to carry out an optimized industrial cut, which often involves the placing of the cuts at an angle which deviates from right-angles to the lengthways direction of the carcass.

These problems are further aggravated when the production rate has to be increased. Typically, a slaughter line as described above will be able to handle 3–500 carcasses an hour, but it is desirable to be able to have an automatic cutting system which can handle 1000–1200 carcasses or more per hours. One of the key problems in increasing the production rate is that the compromise between cutting quality and speed appears to be somewhere in the vicinity of about 0,4 meters per second for cutting speed. At higher cutting speeds a number of undesirable effects appear, such as crushing of bones whereby bone splinters can contaminate the finished meat items, the cut surfaces can be covered by fat which has been pulled out from the meat item to be cut, which is undesirable in the quality of the finished meat products. Furthermore, the carcasses can be forced into a undesirable position in relation to the rest of the cutting proceedings when the saws engage larger bones and the like. Furthermore, in order to be able to adjust the saws in relation to fixed points on the meat in order to carry out the desired cuts, it is advantageous that the saws come to a stand-still such that the gyroscopic effect of the saws will not have any influence on the positioning. By increasing the production speed it can be difficult to provide the necessary period of rest time for the saws in order to adjust them precisely.

SUMMARY OF THE INVENTION

For solving the above-mentioned problems and especially for providing a system with a high capacity a system is disclosed for primal cutting-up of meat items, comprising a laying-down module, a vision detection system for the relevant fix points on meat items, a calculation unit with an interface for the controlling of a positioning module controlling a saw module, wherein:

a) the laying down-module comprises two overlapping conveyors having substantially the same transport direction and transport plane:

1) a first conveyor comprising spaced tracks which are synchronously driven, and on which conveyor substantially U-shaped laying-down fixtures are arranged, and that the lowest points on at least two outermost of said fixtures are lying on a line oriented substantially at right-angles to the transport direction, and that at least a section of said first conveyor overlapping a second conveyor has a downward sloping section in the transport direction;

2) and a second conveyor comprising spaced tracks arranged in the spaces between the tracks of said first conveyor, such that meat items placed in the U-shaped laying down fixtures on the sloping portion of said first conveyor will engage the tracks of said second conveyor and thereby be transported in the transport direction by said second conveyor.

b) the vision detection system comprises a camera which camera is connected with a computer with vision detection software, for determining fix points on the meat items passing the camera, which fix points are related to a zero line in relation to which the positioning module controls the saw module;

c) the fix points relation to the zero line is fed to a calculating unit, which calculating unit feeds input to a control unit controlling actuators, which actuators adjusts the saw modules vertical and horizontal position in relation to the input of the fix points of the meat items.

The systems as set out above does not require the carcass to have any stops from it is positioned in the U-shaped laying-down fixtures until they are cut in the sawing station. This in itself provides for increased production. Furthermore, due to the vision detection system identifying fixed points on the meat items such that any tolerances in the placing of the meat items in the U-shaped laying-down fixtures will be compensated by moving the saw instead of moving the carcasses. The transport time from the vision detection system to the saws is used in order to adjust the saws according to the data collected by the vision detection system. In this manner it is possible to greatly increase the production as all movements are kept to a minimum, especially on the heavy items which is, in this case, the meat item. Furthermore, as the meat item tends to be slippery, a rapid movement of the U-shaped laying-down fixtures in a lateral direction relative to the transport direction can cause the U-shaped laying-down modules to conduct the required movement, but sliding on the meat item such that the meat items does not move the same increments as required by the vision detection system, whereby an optimum cut is not achieved.

By moving the saws, which are completely independent of the meat items, it can be assured that an optimum cut will be achieved at all times in that the meat items are not moved except from in the transport direction from the time when the vision detection system detects the fixed points and does the calculation for placing the saws in the most optimum position in order to achieve the desired cuts.

With the U-shaped laying-down fixtures, it is hereby achieved that the meat item/half carcass, after receipt by being successively fed forwards by the suspension conveyor, is placed in the low points of the fixtures, so that before the laying-down on the laying-down conveyor, these are arranged so that the half carcass in the under-supporting points defined by the low points of the two outermost fixtures is lying in a line which is arranged substantially at right-angles to the transport direction of the laying-down conveyor. There is hereby achieved a very uniform positioning and orientation of the transported carcasses, which by the vertical downwards-directed displacement of the fixtures subsequently places the half carcasses in this position on the laying-down conveyor for transport in the further cutting-up process. Moreover, it will not always be certain that the low point in the centermost fixture lies on the line which can be drawn between the two outermost fixtures.

Moreover, with this construction of the laying-down module, it will be possible to place the two outermost fixtures in a manner in which they are displaced from each other, so that the line between the low points of these fixtures deviates from right-angles to the transport direction of the laying-down conveyor. With this embodiment, the changing of this angle can take place only by constructional intervention, which hardly satisfies the demands concerning flexibility which are placed in connection with the primal cutting-up of meat items, namely in the carrying out of optimized industrial primal cutting up.

The subsequent sub-claims 2–7 disclose how said demands for speed and flexibility can be increased.

In a further advantageous embodiment is disclosed a system wherein the U-shaped laying down fixtures are provided with adjustment means for carrying out a relatively horizontal displacement of the substantially U-shaped laying-down fixtures in the spaces between the tracks of said second conveyor, so that the line between the lowest points of the laying-down fixtures and the transport direction of the conveyors forms an angle which can deviate from right-angles relative to the transport direction of the laying down conveyor.

In practice, this possibility of fine adjustment will be sufficient in connection with the carrying out of optimized industrial cuts, where most often there is a need only to achieve smaller relative displacements between the low points of the two outermost fixtures in order for the line between these to form an angle which deviates from right-angles to the transport direction of the laying-down conveyor.

In a still further preferred embodiment a system wherein an angling-out mechanism driven by a drive mechanism is provided on a frame of the system, by means of which the laying down fixtures are horizontally displaceable between an angled-out position where lowest points of the laying down fixtures are on a line at a right angle to the transport direction of the first conveyor, and an angled-out where said line forms another, pre-selected angle in relation to the transport direction.

On the other hand, if a subsequent ham cut ("Belgian cut") is to be made, it will be necessary to place the fixtures, possibly with the adjustment means as described above in conjunction with the angling-out mechanism, whereby the laying-down fixtures are relatively displaced by an actual movement each time a meat item is received from the suspension conveyor, so that the low points of the two outermost fixtures are lying on a line which forms a predetermined angle in relation to the transport direction, so that the carcasses in this position are placed on the laying-down conveyor at an inclined angle, and in this position are transported further by the laying-down conveyor to subsequent steps in the process.

Furthermore, in a still further advantageous embodiment the said saw module comprises at least two independently controllable saws which saws by means of actuators may be horizontally and vertically adjusted with respect to fix points on the meat items determined by the vision detection system, and a third conveyor positioned under the saws, for transporting the meat items through the saw module.

In a further advantageous embodiment of the invention the third conveyor position under the saw comprises one or more parallel tracks substantially parallel to said first and second conveyors and that the tracks are of the pattern chain type having cone tops. By providing the third conveyor with the so-called cone tops or the like it is assured that a good grip, i.e. a high friction, will be provided between the meat items being transported on the conveyor and the conveyor itself, whereby the sliding will be avoided and, furthermore, the high production rate can be attained.

In a further advantageous embodiment each track of said third conveyor may be elevated or lowered separately from a neighboring track. This is again an important feature of the system in that by being able to elevate a track and thereby bringing the carcass closer to the saw the actual transport time of the saw can be minimized and, furthermore, it can easily by achieved that it is assured that the saw goes all the way through the meat item and thereby a clean cut is achieved.

It will be obvious that the laying-down module will be able to be arranged for receiving half carcasses for primal cutting-up which are transported successively in pairs on the suspension conveyor.

The advantages of the system should be obvious, i.e. providing such a system includes a laying-down module with all of the associated advantages and there is hereby achieved a fully-automatic system for primal parting of meat items, which practically speaking enables automatically-implemented parting of meat items in accordance with any desired cut positioning, and which also allows continuous optimization of the cut positioning, not only in relation to average considerations concerning the determination of fix points on a series of transported meat items/carcasses, but optimization in relation to fix-point determinations carried out on each individual meat item, and subsequent placing of the ideal cut line on the basis of empirical ideal cut lines for a meat item with size and fix-point placing determined by the vision detection system.

The invention is also directed towards a method based on a vision detection system for primal parting of meat items comprising the following steps:

a) the receiving of meat items fed successively onto a laying-down module by two overlapping conveyors having substantially the same transport direction and transport plane:

1) a first conveyor comprising spaced tracks which are synchronously driven, and on which conveyor substantially U-shaped laying-down fixtures are arranged, and that the lowest points on at least two outermost of said fixtures are lying on a line oriented substantially at right-angles to the transport direction, and that at least a section of said first conveyor overlapping a second conveyor has a downward sloping section in the transport direction;

2) and a second conveyor comprising spaced tracks arranged in the spaces between the tracks of said first conveyor, such that meat items placed in the U-shaped laying down fixtures on the sloping portion of said first conveyor will engage the tracks of said second conveyor and thereby be transported in the transport direction by said second conveyor by a suspension conveyor with lengthways axes of the meat items oriented substantially at right-angles to a transport directions of the laying-down module;

b) the positioning of the meat items at the laying-down and angle positioning module meat items positioned with the lengthways axes to a preferred angle in relation to a right-angle with respect to the transport direction of the laying-down conveyor;

c) feeding the meat items on the laying-down module in the transport direction toward to a vision detection system comprising a camera which camera is connected with a computer with vision detection software, for determining fix points on the meat items passing the camera, which fix points are related to a zero line in relation to which the positioning module controls the saw module;

d) taking pictures of the meat items with the vision detection system for the determination of fixed points on said meat items;

e) feeding the fixed points position in relation to a zero line to a calculating unit, which calculating unit feeds input to a control unit controlling actuators, which actuators adjusts the saw modules vertical and horizontal position in relation to the input of the fix points of the meat items;

f) feeding of the meat items to a third conveyor at a saw module and g) the parting of the meat items by cutting-up with the saw during transport of the meat items by said third conveyor of the saw module.

The method according to the invention is based on the use of the above-mentioned known vision system for detection of the fix points which form the basis for the positioning of the parting cuts, no matter whether these are standard industrial cuts or ham cuts ("Belgian cuts"), or other special cuts such as optimized industrial cuts used in the primal cutting-up, so that manual handling in the cutting-up process is avoided, and also so that human errors in connection with the placing of the cuts are eliminated. In this connection it should be mentioned that the angles $V_1$ and $V_2$ can assume the value zero (typically with industrial parting cuts).

Further advantageous embodiments comprise that the meat items are transported successively in pairs on a suspension conveyor to the laying-down module, and wherein the taking of pictures by the vision system for determination of the fixed points are taken of at least a first of the two meat items of the pairs.

And in a still further advantageous embodiment the meat items are half carcasses.

With the invention, use is thus made of the fact that the calculation of the positioning of the fix point in relation to the zero line can be carried out no matter whether the half carcasses arrive at the picture-taking section with the lengthways direction arranged at right-angles to the transport direction, or at an angle which deviates from right-angles.

Whether the half carcasses arrive at the picture-taking section with lengthways direction at right-angles to the direction of transport, or at an angle which deviates from this, is thus determined on the basis of how the primal cutting-up of the half carcasses is to be carried out by the saw module, the blades of which are oriented parallel with the transport direction. If, for example, a traditional industrial cut is to be effected, where the half carcass is divided with a fore-end cut and/or a rear-end cut, it is normally preferred that the half carcass is conveyed into the cutting plant (and herewith to the picture-taking section) with the lengthways direction arranged at right-angles to the transport direction, after which said cut is effected in relation to the pubis and especially the armpit, typically so that upon passage of the positioning module, the half carcass is positioned in relation to the cutting line of the ham saw, with starting point in the positioning of the pubis, and the cut line of the saw system's fore-end saw is lined up in relation to the position of the armpit.

If a "Belgian cut" (ham cut) is to be effected, it is preferred that the half carcass be conveyed into the cutting plant (and herewith to the picture-taking section) with lengthways direction oriented at an inclined angle in relation to the transport direction, after which the cut is effected solely in relation to the position of the pubis, which is made possible by the laying-down module according to the invention.

With the combination between the use of a vision-controlled positioning and cutting-up system and the laying-down module according to the invention, with the invention there is achieved a fully-automatic and very precise cutting-up of half carcasses which shall be parted with Belgian cuts (ham cuts) and optimized industrial cuts, in that the half carcasses are laid down on the laying-down conveyor with the lengthways direction of the carcass at a pre-selected angle in relation to the transport direction, corresponding to the preferred angle with which the cutting-up with Belgian cuts, or optimized industrial cuts, is carried out with a cutting system which has saw blades arranged parallel with the transport direction.

In the following, the invention is explained in more detail with reference to the drawing, where.

BRIEF DESCRIPTION OF THE DRAWINGS

DETAILED DESCRIPTION OF THE INVENTION

Figure 1:
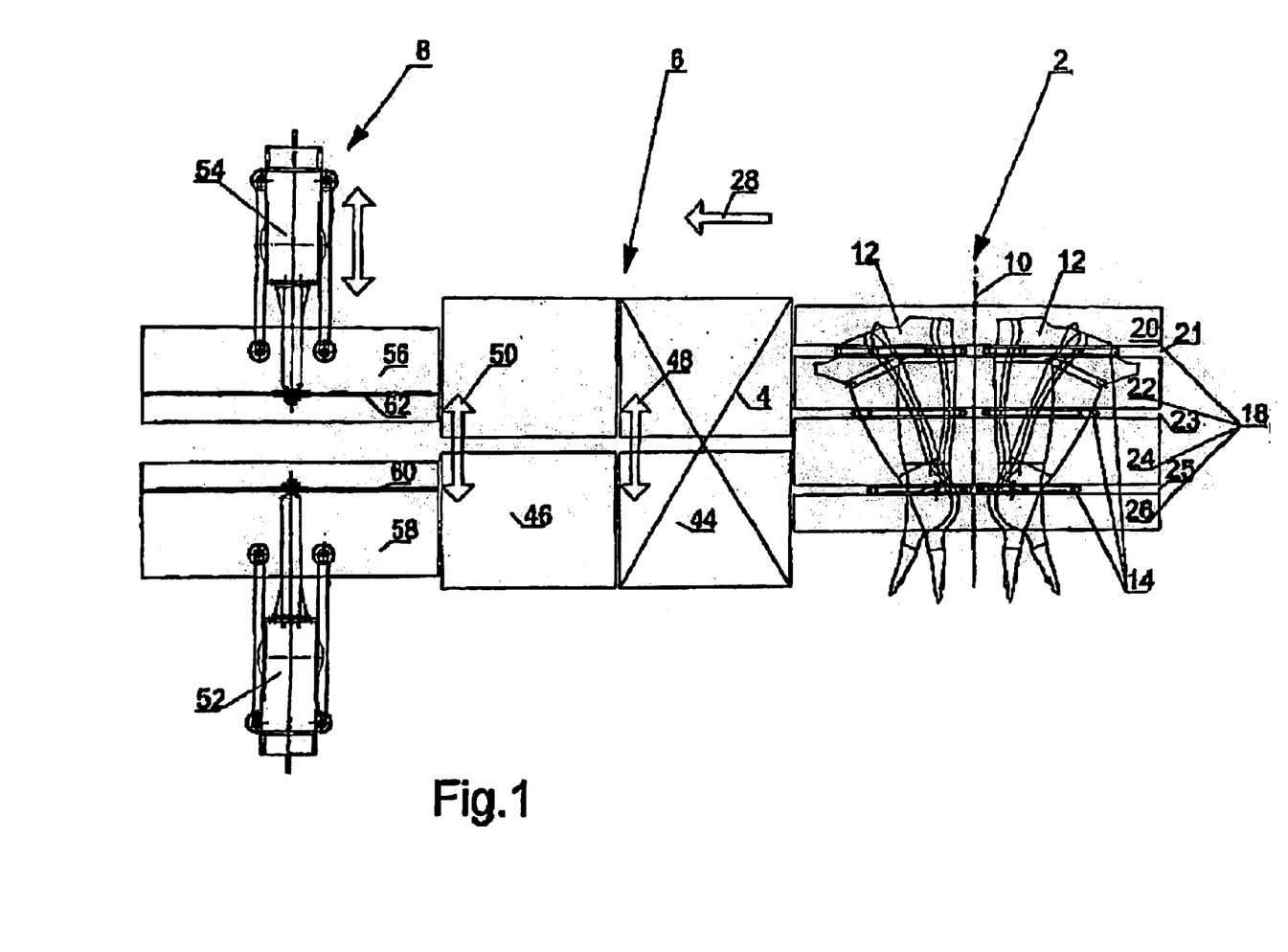
FIG. 1 is a schematic plan view of a fully-automatic vision-controlled cutting-up system with laying-down modules according to the invention, and comprising an angle-positioning system.

FIG. 1 shows a schematic view of an embodiment of a fully-automatic cutting-up system for primal parting of half carcasses of pigs. The system is intended for adjustment for carrying out practically all types of known, desired primal parting cuts.

In the embodiment shown, the cutting-up system comprises a laying-down module 2, a vision system 4 (with associated calculation unit and interface for actuators which are not shown in detail, in that this is considered to be known technique), placed over a positioning module 6, and a saw module 8. Above the laying-down module 2, there extends a laying-down conveyor 10 (cf. FIG. 2) for the successive delivery of related half carcasses 12 to the laying-down module 2.

As indicated in FIG. 1, and as shown clearly in FIGS. 2, 3A, 3B and 4, the laying-down module 2 comprises a set of substantially U-shaped laying-down fixtures 14 which are laterally reversed in relation to each other. As will appear from FIGS. 3A and 3B, the fixtures 14 are suspended on a vertically-displaceable base frame 16 between two outer positions, where the upper sides of the fixtures are lying at a level above the laying-down module's conveyor 18, and respectively where the uppermost parts of the fixtures 14 are lying at a level below the surface of the conveyor belt.

As will appear from FIG. 1, the conveyor 18 is divided into four tracks/belts 20, 22, 24, 26, which are mutually spaced apart by the spaces 21, 23, 25. The breadth of the tracks/belts is determined respectively by a preferred total belt breadth of the conveyor 18, and by the distance between the individual hoops in the fixtures 14. The individual belts are moved in a synchronous manner in the transport direction of the conveyor. The transport direction of the conveyor and the transport direction of the whole of the cutting-up system is indicated by the arrow 28 in FIG. 1.

Figure 4:
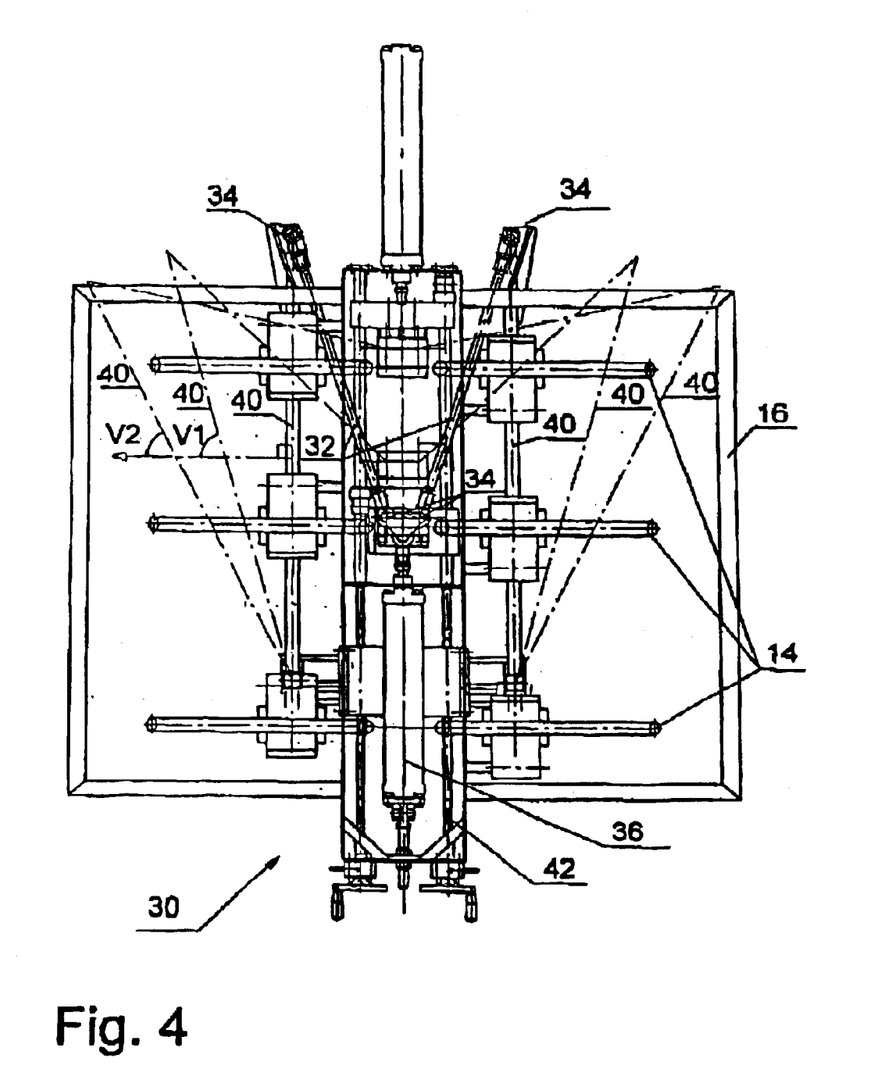
FIG. 4 is a plan view of FIG. 5 showing the angling-out mechanism.

The fixtures 14 are also connected to an angling-out mechanism 30 cf. FIG. 4 mounted on a base frame 16. The angling-out mechanism is connected with the fixtures 14 via rod connections 32 with pivot link 34, which in turn stand in connection with an actuator in the form of a displaceable piston 36, the displacement of which causes a mutually reversed displacement in the lateral direction of the anchoring points for the U-shaped fixtures, so that the line 40 which is described by the low points 38 of the U-shaped fixtures 14 is displaced from a direction at right-angles to the transport direction 28 of the conveyor, so that this line forms an angle $V_1$ or $V_2$ which deviates from right-angles. The angling-out mechanism also comprises adjustment mechanisms 42 for fine adjustment of the angular displacement.

It should be noted that the angling-out mechanism 30 can be completely omitted, providing that the system is intended for use only for the carrying out of industrial parting cuts or optimized industrial cuts, where the meat items/carcasses 12 are laid down on the conveyor 18 in a position where the low points 38 of the outermost U-shaped hoops in the laying-down fixtures 14 are lying on a line at right-angles to the transport direction 28 of the conveyor, possibly with a small angular deviation adjusted by means of the adjustment mechanism 42, for carrying out an optimized industrial cut. If it is desired to effect industrial parting cuts only, the adjustment mechanism 42 can also be omitted.

Figure 2:
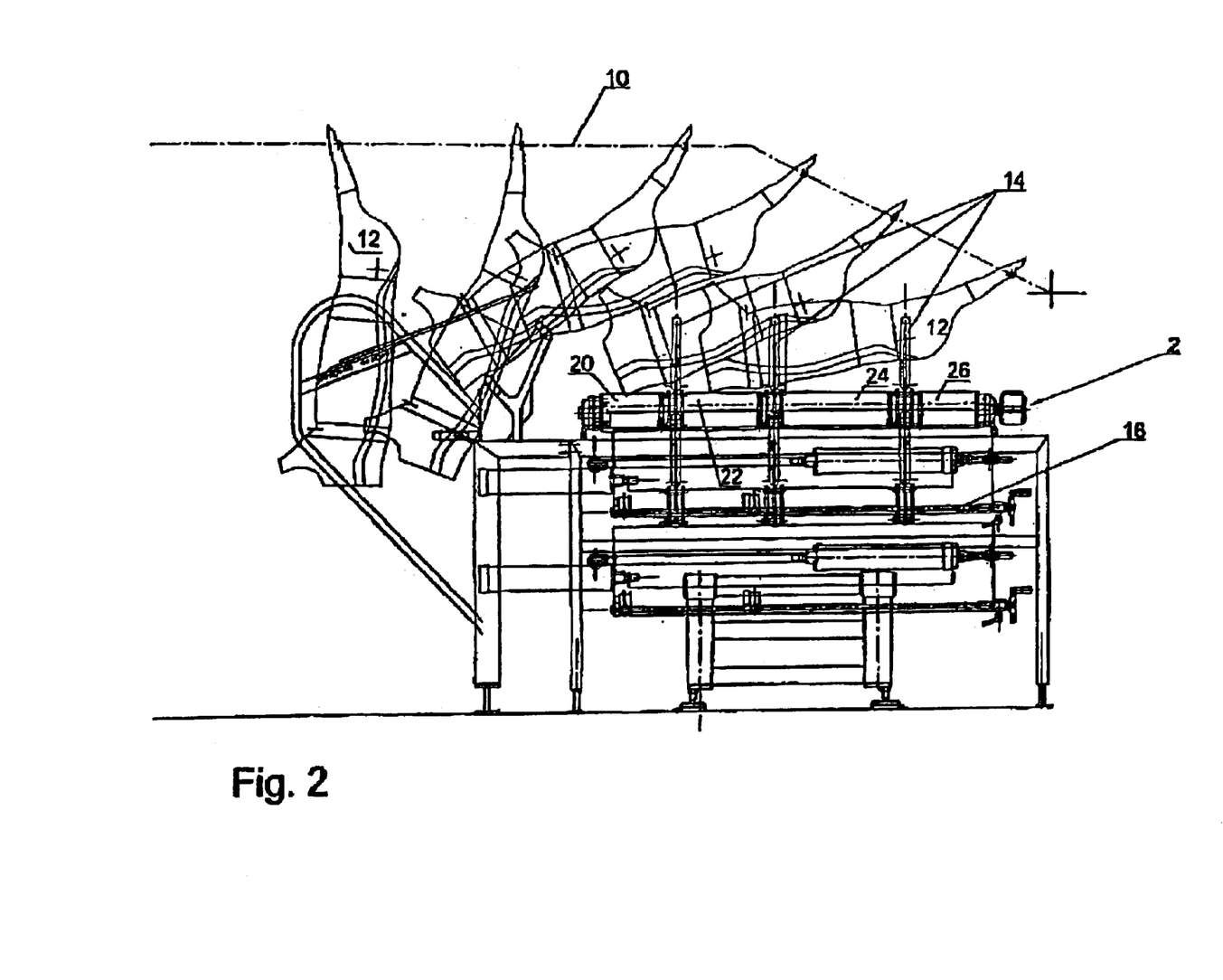
FIG. 2 is a detail view of the procedure of laying-down half carcasses in the laying-down module.
Figure 3A:
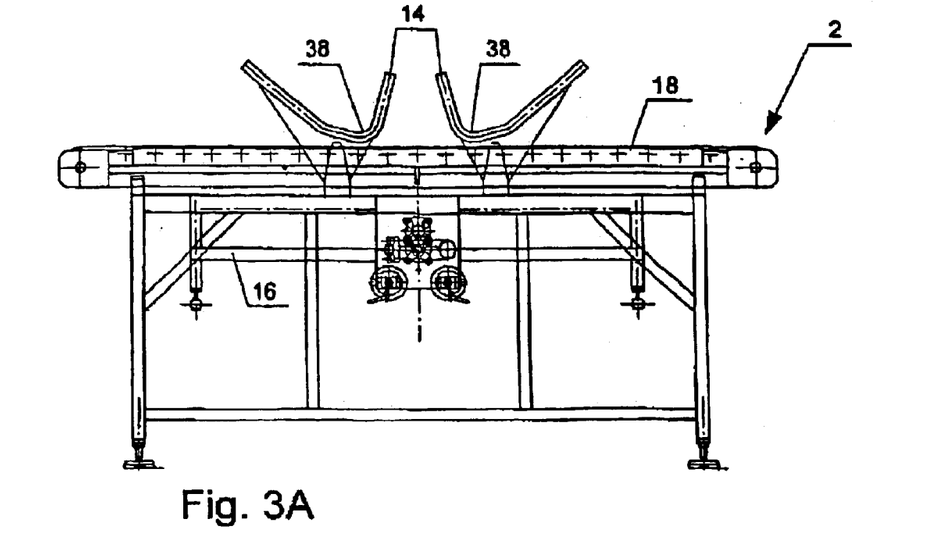
FIGS. 3a and 3b are detail side views of the laying-down module according to the invention.
Figure 3B:
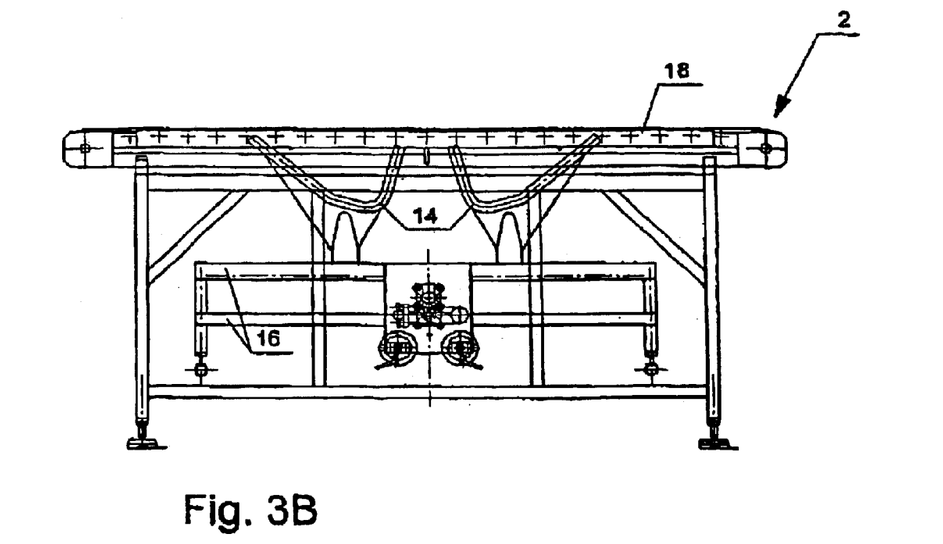

In FIG. 2 it is shown how the half carcasses 12 are laid down on the laying-down module 2 from a laying-down conveyor 10. The half carcasses 12 are laid down on the raised fixtures 14 which are disposed in the receiving position above the belts 20, 22, 24, 26 of the conveyor. The half carcasses 12 are hooked off the conveyor 10, which is determined by the length of the half carcasses. Moreover, the half carcasses are transported in pairs to and subsequently laid down in the fixtures 14.

The positioning module 6 comprises two conveyors 44, 46 placed in extension of each other, where above the conveyor 44 closest to the laying-down module 2 there is placed a vision camera 4. By means of a known technique, the conveyors 44, 46 are displaceable in the sideways direction by not-shown actuators, as indicated by the arrows 48, 50. The actuators for the sideways displacement of the conveyors 44, 46 are controlled by a computer (not shown).

The saw module 8 comprises a ham saw 52 and a sideways-displaceable fore-end saw 54. The saw blades are oriented parallel with the transport direction 28 in the cutting plant, and have an extent so that the edges extend a distance down below the surface of the conveyor belt 56, 58 of the saw module.

The fully-automatic primal cutting-up system's laying-down module 2, positioning system 6, vision system 4 and saw module 8, are all connected to a computer (not shown) which, on the basis of the vision system's picture analysis, calculates the actual positioning of the fix points for the positioning of the parting cuts for the desired cutting-up, in relation to a zero line. Hereafter, the half carcasses 12 are moved in by sideways displacement of the positioning conveyor's belts 44, 46, preferably so that the placing of the ham cut, which is determined by the position of the pubis, is positioned in relation to the saw-blade line 60 for the ham saw 52, after which the fore-end saw is displaced in the sideways direction in relation to the desired placing of the fore-end parting cut, which is typically determined on the basis of the position of the ulna. Hereafter, the half carcasses are transferred through the saw module during the carrying out of the parting cuts.

In connection with fully-automatic parting with "Belgian cuts", which comprises only a single inclined ham cut in between the groin of the carcass and across the carcass towards the ham, it will be necessary to use the angling-out mechanism 30, so that the lengthways direction of the carcass is arranged at an angle $V_2$ in relation to the direction of transport through the saw line 60 for the ham saw 52 of the saw module.

However, a certain angling-out of the half carcasses 12 is also required, though less than the angling-out with the "Belgian cut", when carrying out a traditional industrial parting cut, which comprises two cuts, i.e. the ham cut and the fore-end cut along the saw lines 60, 62. The changeover for this purpose can quickly be carried out by means of the angle adjustment mechanism 42.

Figure 5:
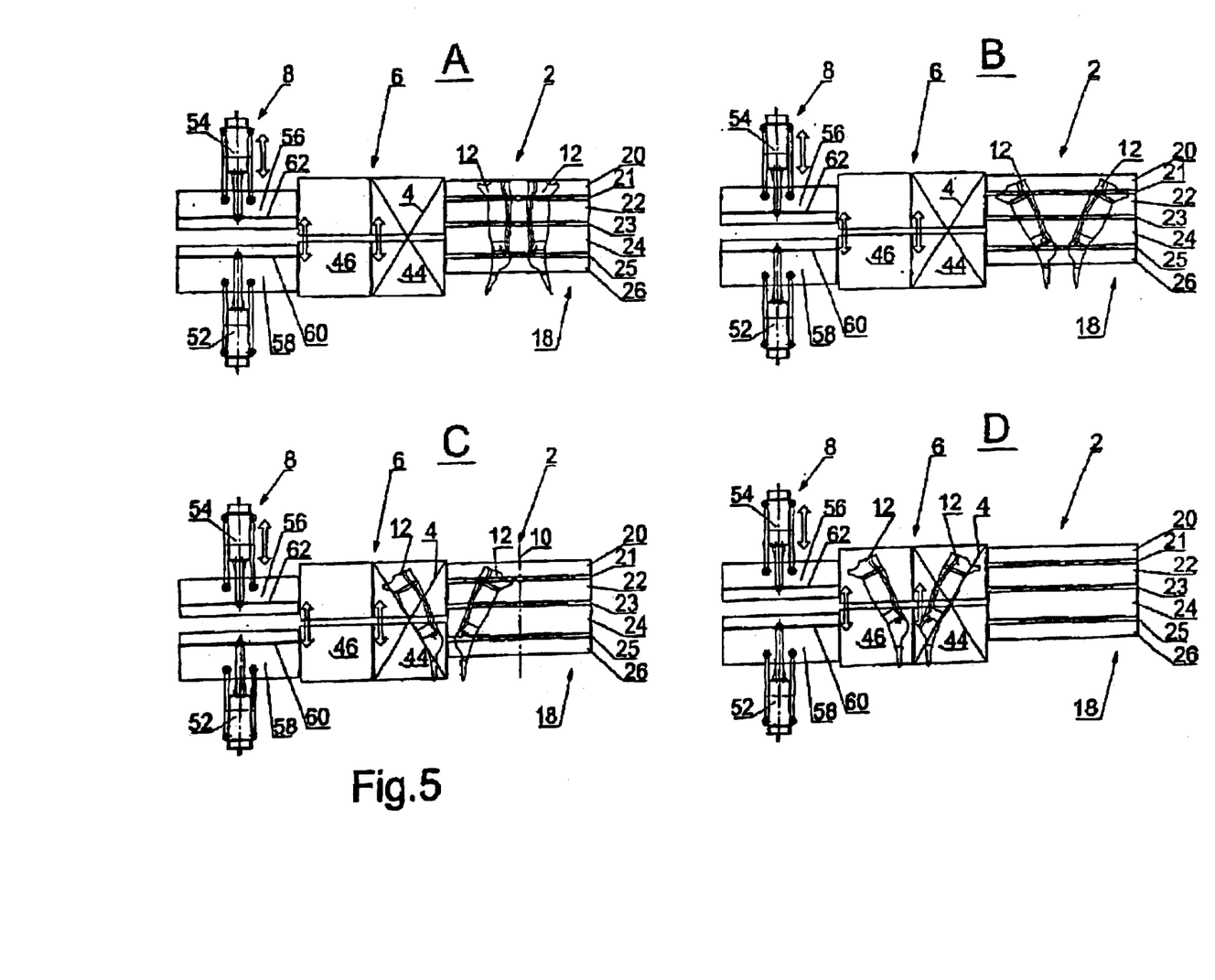
FIG. 5 is a schematic plan view of the system shown in FIG. 1 in the carrying out of Belgian cuts.

In FIGS. 5A to 5H it is shown how the parting of half carcasses 12 with the "Belgian cut" is carried out with a fully-automatic cutting system. In FIG. 5A, a first pair of half carcasses 12 arrive at the laying-down module 2 in the fixtures 14 (not shown for the sake of clarity), after which an angling-out (FIG. 5B) is carried out by the angling-out mechanism 30 (FIG. 4) and a subsequent lowering of the fixtures 14 (cf. FIG. 3B). The first of the two half carcasses 12 is fed in the transport direction 28 on to the positioning conveyor 44 (FIG. 5C), where the vision system 4 takes a picture of the half carcass, and this is sent to a picture analysis unit (not shown) which determines relevant fix points on the carcass for the positioning of the parting cuts, after which (FIG. 5D) the half carcass 12 is transferred to the positioning conveyor 46 where a positioning of the carcass 12 is carried out in relation to the saw line 60 for the ham saw 52. At the same time, the second half carcass 12 is fed in under the vision system 4 for the taking of a picture. Hereafter, the foremost positioned half carcass 12 is fed (FIG. 5E) forwards towards the saw module's saw 52, and the next pair of half carcasses 12' are received in the laying-down module 2, and the sawing of the foremost half carcass is started (FIG. 5F) at the same time that the positioning of the second half carcass is effected by the sideways displaceable conveyor 46 in the positioning module 6, and the next pair of half carcasses 12' are angled-out in the laying-down module 2. After positioning of the second half carcass 12, this is fed into the saw module 8 (FIG. 5G) where sawing-up is commenced along the line 60. At the same time, the foremost half carcass 12' of the next pair of half carcasses is fed to the vision system 4 on the conveyor 44 for the taking of a picture. With the sawing of the rearmost half carcass 12 (FIG. 5H) of the first pair of half carcasses 12, the foremost half carcass 12' of the second pair of half carcasses 12' is positioned by the sideways displaceable conveyor 46 at the same time that the second half carcass is photographed by the vision system on the conveyor 44. Hereafter, the procedures as described above are repeated.

Figure 6:
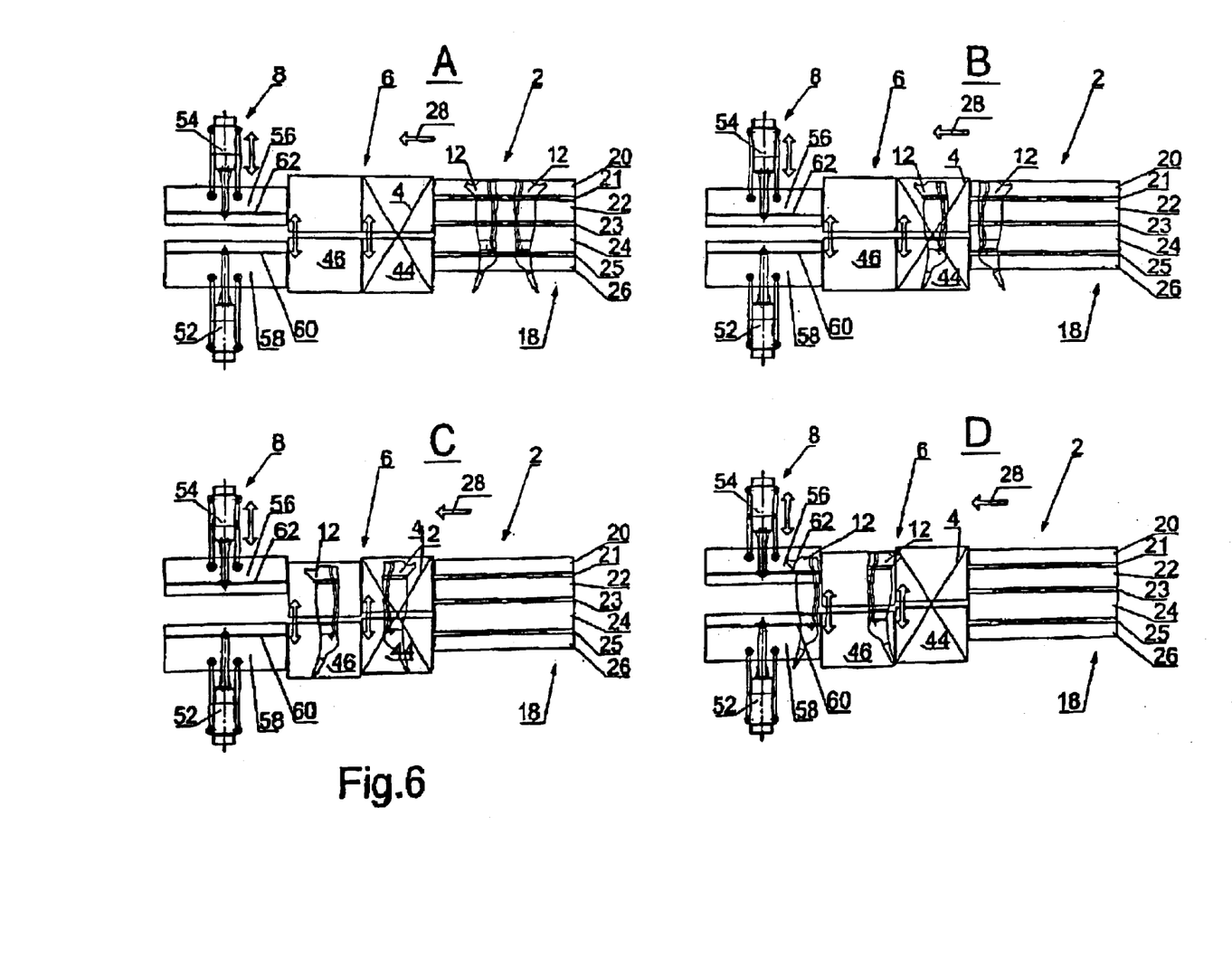
FIG. 6 is the same as FIG. 5, but where industrial cuts are carried out.

FIGS. 6A–6G show fully-automatic cutting-up when carrying out a traditional industrial cut, without angle positioning at the laying-down module 2, but where in the same manner as described above there is carried out a fix-point determination by the vision system 4 (FIG. 6B), a subsequent positioning in the sideways direction (FIG. 6C) for the cut line 60 for the ham saw 52, and a simultaneous positioning of the fore-end saw 54, followed by the feeding of the foremost half carcass 12 to the saw module 8 (FIG. 6D, positioning of the second half carcass 12 (FIG. 6E), and at the same time as the arrival of the next pair of half carcasses 12" in the laying-down module 2. The only difference in the implementation of the sequences for the industrial cut is that here there is also carried out a positioning of the cut line 62 for the fore-end saw 54 on the basis of a further fix point determined by the vision system, and that as opposed to the implementation of the ham cut, use is made of the fore-end saw.

There is thus disclosed a fully-automatic primal cutting system for carrying out "Belgian cuts" and ordinary industrial cuts, possibly effected in an angle-positioned implementation as a so-called optimized industrial cut.

Figure 7:
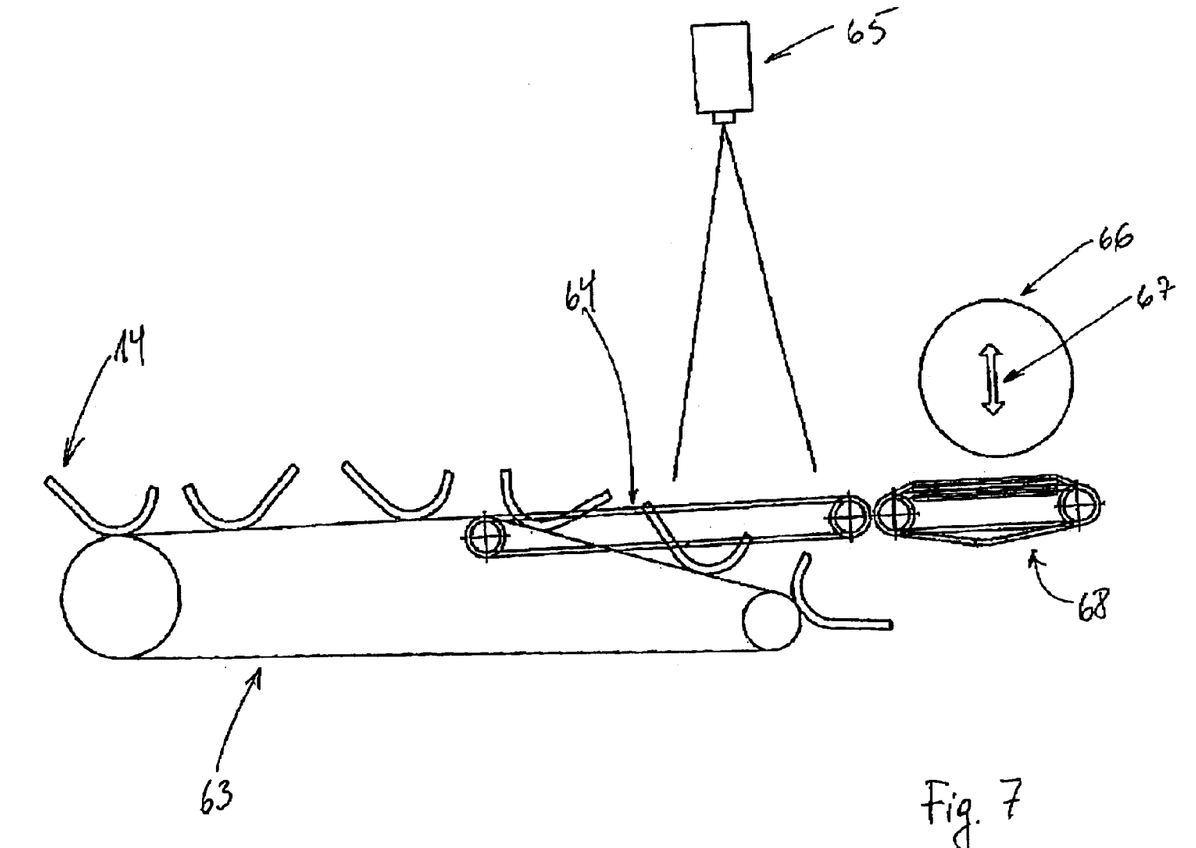
FIG. 7 shows a schematic view of a preferred system.

In FIG. 7 is illustrated a system for primal cutting-up of meat items, where rather high production targets can be achieved.

At a target capacity of 1200 pigs an hour, a pig shall be positioned every third second. Turning now to FIG. 7, the carcasses which are already divided in two, are brought to the first conveyor 63 and positioned in the U-shaped laying-down fixtures 14 attached to the first conveyor 63.

The first conveyor 63 comprises a number of spaced parallel tracks which are synchronously driven. Furthermore, the first conveyor 63 is overlapping a second conveyor 64. In the overlap the first conveyor has a downwardly sloping section such that the carcasses being held in the U-shaped fixtures 14 will be transferred to the second conveyor 64 as the fixtures 14 are transported below the level of the second conveyor 64 such that the second conveyor will engage the carcasses and provide for the further transport.

As a carcass is transferred on the second conveyor 64 it will be transported past a vision detection system comprising a camera 65. The camera will send an image to a calculating unit (not shown) which will have an optical recognition system software such that particular fixed points on the meat items have been pre-programmed into the system such that when the camera forwards the picture of the meat item passing on the conveyor 64, characteristic fixed points on the meat items can be determined. The calculating unit thereafter forwards this information to actuators (not shown) which actuators adjust the saw module 66. The arrow 67 indicates the cutting direction, i.e. the direction of movement of the saw module 66. Connected to the saw module is also a third conveyor 68, which will be further explained with reference to FIG. 8.

It should be noted that only a limited amount of U-shaped laying-down fixtures 14 has been indicated on the first conveyor, but in practice, fixtures 14 will be arranged as closely as possible on the first conveyor in order to achieve the productivity aimed at.

Tests have shown that the downward movement 67 of the saw module is in the vicinity of 200 mm, where the maximum cutting speed in order to achieve an acceptable quality of the cut and in order to avoid problems with bone crushing, fat distortion etc. is 400 mm per second. This leaves the time for performing the cut through the meat item to be approximately half a second, and the necessary time for pulling the saw back up is about 0,25 second.

The vision recognition analysis and the calculations as well as the adjustment of the actuators requires 0,25 second. Furthermore, it is assumed that the transport speed will be 1000 mm per second and that the distance a carcass has to travel from it is delivered till a new one is placed is approximately 700 mm. This leaves a transport time of 0,7 second for the entire carcass through the system for primal cutting-up as disclosed above.

In order to have enough time to position the saw module, the transport time minus the vision analysis time leaves 0,45 second for positioning of the saw module.

Adding all the separate steps a cycles time for each carcass is approximately 1,2 seconds. This, in turn, leaves a theoretical capacity for the systems as described above at 1500 whole pigs per hour. As the target was 1200 pigs an hour, there is a little slack in the system. At the capacity of 1200 pigs an hour, a pig needs to be placed every third second in the U-shaped positioning fixtures 14. This can be achieved with a system as described above. Assuming that the normal distance between pigs is 1500 mm, which is traditional today, the speed of the first conveyor shall be 0,5 meters per second. This speed is so relatively low compared to what is customary that it is possible to have a variable speed, for example by means of a frequency converter coupled to the driving means of the first conveyor such that the speed when the carcass is positioned in the U-shaped fixture can be lowered, whereby a higher precision can be achieved such that less adjustment of the saw module is necessary.

Figure 8:
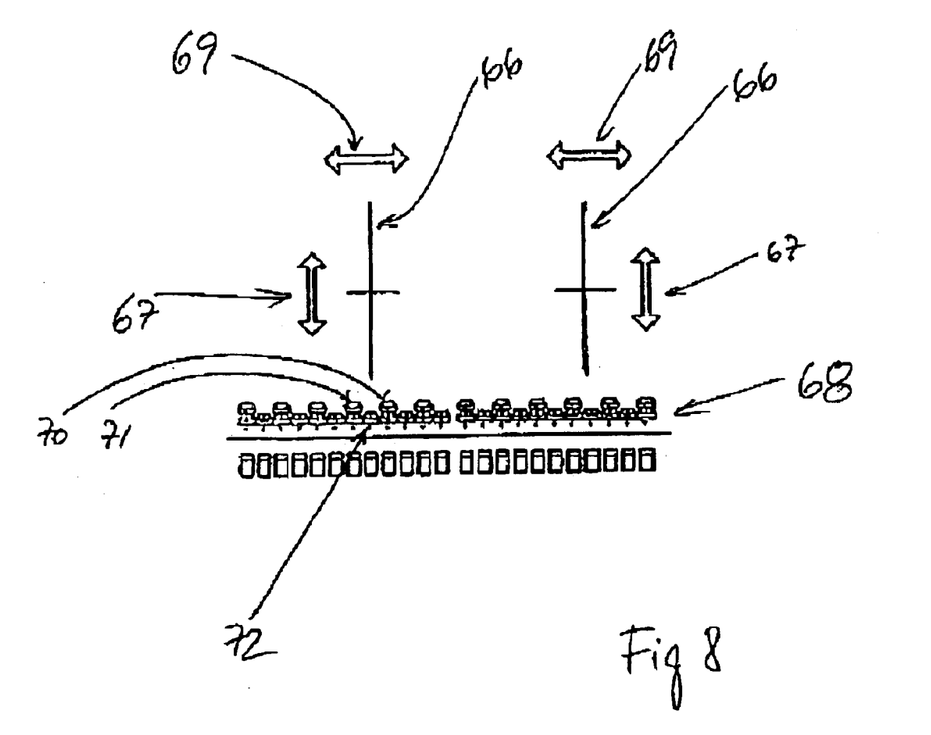
FIG. 8 shows a schematic view of a cross section of a saw module.

In FIG. 8 is illustrated a cross section through the saw module comprising saws 66 and a third conveyor 68. The saws 66 can be manipulated by means of actuators controlled by the calculating unit reacting in response to information received via the vision detection system in a vertical direction 67 and a horizontal direction 69 generally perpendicular to the transport direction of the first, second and third conveyor.

The third conveyor 68 is, like the other two conveyors in the system, built up of a number of parallel, separate tracks. In the conveyor 68 of the saw module each track can be elevated or lowered in relation to any other track of the third conveyor such that a height difference can be created between two neighboring tracks. In this manner it can be achieved that two tracks 70,71 are elevated and a third track 72 is lowered such that the cutting by the saw 66 can be further improved and that it can be assured that a complete cut throughout the meat items by the saw 66 can be achieved.

As the vision detection system is stationary in respect to the third conveyor 68, information regarding the fixed points, which is already fed to the calculating unit, will also be used in controlling which tracks 70–72 of the conveyor 68 will be elevated, respectively lowered, in order to create a gap underneath the saw 66 which is to perform the cut.

Although the invention has been described with respect to a number of specific embodiments the invention is only to be limited by the scope of the appended claims.

What is claimed is:

1. A system for primal cutting-up of meat items, comprising a laying-down module, a vision detection system for the relevant fix points on meat items, a calculation unit with an interface for the controlling of a positioning module controlling a saw module, wherein:

a) the laying down-module comprises two overlapping conveyors having substantially the same transport direction and transport plane:

I) a first conveyor comprising spaced tracks which are synchronously driven, and on which conveyor substantially U-shaped laying-down fixtures are arranged, and that the lowest points on at least two outermost of said fixtures are lying on a line oriented substantially at right-angles to the transport direction, and that at least a section of said first conveyor overlapping a second conveyor has a downward sloping section in the transport direction;

II) and a second conveyor comprising spaced tracks arranged in the spaces between the tracks of said first conveyor, such that meat items placed in the U-shaped laying down fixtures on the sloping portion of said first conveyor will engage the tracks of said second conveyor and thereby be transported in the transport direction by said second conveyor;

b) the vision detection system comprising a camera which camera is connected with a computer with vision detection software, for determining fix points on the meat items passing the camera, which fix points are related to a zero line in relation to which the positioning module controls the saw module;

c) the fix points relation to the zero line is fed to a calculating unit, which calculating unit feeds input to a control unit controlling actuators, which actuators adjusts the saw modules vertical and horizontal position in relation to the input of the fix points of the meat items.

2. A system for primal cutting-up of meat items according to claim 1, wherein the U-shaped laying down fixtures are provided with adjustment means for carrying out a relatively horizontal displacement of the substantially U-shaped laying-down fixtures in the spaces between the tracks of said second conveyor, so that the line between the lowest points of the laying-down fixtures and the transport direction of the conveyors forms an angle which can deviate from right-angles relative to the transport direction of the laying down conveyor.

3. A system for primal cutting-up of meat items according to claim 2 where an angling-out mechanism driven by a drive mechanism is provided on a frame of the system, by means of which the laying down fixtures are horizontally displaceable between an angled-out position where lowest points of the laying down fixtures are on a line at a right angle to the transport direction of the first conveyor, and an angled-out where said line forms another, pre-selected angle in relation to the transport direction.

4. A system for primal cutting-up of meat items according to claim 2 wherein the saw module comprises at least two independently controllable saws which saws by means of actuators may be horizontally and vertically adjusted with respect to fix points on the meat items determined by the vision detection system, and a third conveyor positioned under the saws, for transporting the meat items through the saw module.

5. A system for primal cutting-up of meat items according to claim 4 wherein the third conveyor positioned under the saws comprises one or more parallel tracks, substantially parallel to said first and second conveyors, and that the tracks are of the batten chain type having cone tops.

6. A system for primal cutting-up of meat items according to claim 5 wherein each track of said third conveyor may be elevated or lowered separately of a neighboring track.

7. A method, based on a vision detection system for primal cutting-up of meat items comprising the following steps:

a) the receiving of meat items fed successively onto a laying-down module by two overlapping conveyors having substantially the same transport direction and transport plane:

I) a first conveyor comprising spaced tracks which are synchronously driven, and on which conveyor substantially U-shaped laying-down fixtures are arranged, and that the lowest points on at least two outermost of said fixtures are lying on a line oriented substantially at right-angles to the transport direction, and that at least a section of said first conveyor overlapping a second conveyor has a downward sloping section in the transport direction;

II) and a second conveyor comprising spaced tracks arranged in the spaces between the tracks of said first conveyor, such that meat items placed in the U-shaped laying down fixtures on the sloping portion of said first conveyor will engage the tracks of said second conveyor and thereby be transported in the transport direction by said second conveyor by a suspension conveyor with lengthways axes of the meat items oriented substantially at right-angles to a transport directions of the laying-down module;

b) the positioning of the meat items at the laying-down and angle positioning module meat items positioned with the lengthways axes to a preferred angle in relation to a right-angle with respect to the transport direction of the laying-down conveyor;

c) feeding the meat items on the laying-down module in the transport direction toward to a vision detection system comprising a camera which camera is connected with a computer with vision detection software, for determining fix points on the meat items passing the camera, which fix points are related to a zero line in relation to which the positioning module controls the saw module;

d) taking pictures of the meat items with the vision detection system for the determination of fixed points on said meat items;

e) feeding the fixed points position in relation to a zero line to a calculating unit, which calculating unit feeds input to a control unit controlling actuators, which actuators adjusts the saw modules vertical and horizontal position in relation to the input of the fix points of the meat items;

f) feeding of the meat items to a third conveyor at a saw module and g) the parting of the meat items by cutting-up with the saw during transport of the meat items by said third conveyor of the saw module.

8. Method according to claim 7, wherein the meat items are transported successively in pairs on a suspension conveyor to the laying-down module, and wherein the taking of pictures by the vision system for determination of the fixed points are taken of at least a first of the two meat items of the pairs.

9. Method according to claim 8, wherein the meat items are half carcasses.

* * * * *